(12) United States Patent
Kehrer et al.

(10) Patent No.: US 7,434,794 B2
(45) Date of Patent: Oct. 14, 2008

(54) MASS TRANSFER METHOD USING STATIC PACKINGS

(76) Inventors: Florian Kehrer, Bachtelstrasse 13, CH-8307, Effretikon (CH); Marc Wehrli, Gustrasse 34, CH-8400 Winterthur (CH)

( * ) Notice: Subject to any disclaimer, the term of this patent is extended or adjusted under 35 U.S.C. 154(b) by 732 days.

(21) Appl. No.: 10/841,293

(22) Filed: May 7, 2004

(65) Prior Publication Data
US 2005/0249648 A1    Nov. 10, 2005

(30) Foreign Application Priority Data
May 16, 2003   (EP)   ................... 03405340

(51) Int. Cl.
*B01F 3/04* (2006.01)
(52) U.S. Cl. .............. 261/112.2; 261/DIG. 72
(58) Field of Classification Search .............. 261/112.1, 261/112.2, DIG. 72
See application file for complete search history.

(56) References Cited

U.S. PATENT DOCUMENTS

| | | | | |
|---|---|---|---|---|
| 4,565,216 | A | * | 1/1986 | Meier ...................... 137/561 A |
| 4,915,878 | A | * | 4/1990 | Gyorgy et al. ............ 261/112.2 |
| 5,077,023 | A | * | 12/1991 | Leutner et al. ............ 423/242.4 |
| 5,564,827 | A | | 10/1996 | Signer |
| 5,661,670 | A | * | 8/1997 | Bharathan et al. .............. 703/5 |
| 5,950,454 | A | | 9/1999 | Burst et al. ...................... 62/43 |
| 6,282,497 | B1 | * | 8/2001 | Bharathan et al. ............. 702/23 |
| 6,349,567 | B1 | | 2/2002 | Kessler .......................... 62/643 |
| 6,427,985 | B1 | * | 8/2002 | Kaibel et al. .............. 261/112.2 |
| 6,554,965 | B1 | | 4/2003 | Hartmann et al. ............. 202/158 |
| 6,565,629 | B1 | * | 5/2003 | Hayashida et al. ............ 95/211 |
| 6,598,861 | B2 | * | 7/2003 | Sunder et al. ............ 261/112.2 |
| 2003/0106837 | A1 | * | 6/2003 | Kaibel et al. ................... 208/46 |
| 2005/0016830 | A1 | * | 1/2005 | Kaibel et al. ................... 203/29 |

FOREIGN PATENT DOCUMENTS

| | | |
|---|---|---|
| EP | 0472491 | 2/1992 |
| EP | 0509929 | 10/1992 |
| EP | 0995958 | 4/2000 |
| EP | 1074296 | 2/2001 |

(Continued)

*Primary Examiner*—Scott Bushey
(74) *Attorney, Agent, or Firm*—Francis C. Hand; Carella, Byrne, Bain et al.

(57) ABSTRACT

The use of a cross-passage packing made of a metal fabric relates to a method in which an exchange of material and/or of heat is carried out between a liquid stream and a gas or vapour stream. The fabric packing (1) used is composed of vertical layers (11', 12') which consist of corrugated or pleated metal fabrics (11, 12) which form flow passages (13). The gas or vapour stream flows in the flow passages and the liquid stream flows on the metal fabric. The flow passages of adjacent layers cross in an open manner. The angle between crossing passages is lower than approximately 100°. In this method, the fabric packing is acted on by a relatively small liquid loading. The metal fabric forms a carrier for the liquid stream that is largely free of holes or other apertures. Values for the liquid loading are selected in accordance with the relationship L/a<10 l/mh, where L is the specific surface loading in volume units of the liquid per surface unit of the packing cross-section, and a is the specific surface which the metal fabric spans.

8 Claims, 2 Drawing Sheets

FOREIGN PATENT DOCUMENTS

| | | |
|---|---|---|
| EP | 1195563 | 4/2002 |
| EP | 1312409 | 5/2003 |
| WO | 9702880 | 1/1997 |
| WO | 9716247 | 5/1997 |
| WO | WO9900180 | 1/1999 |

* cited by examiner

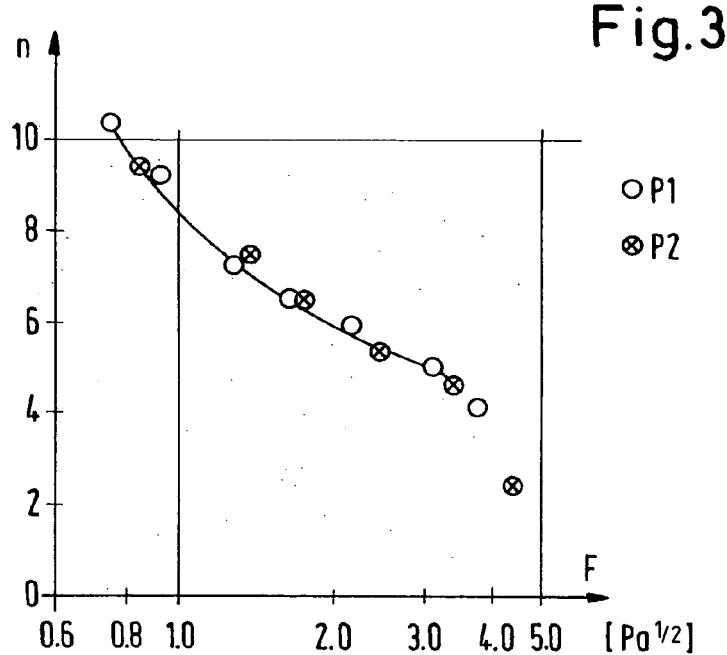
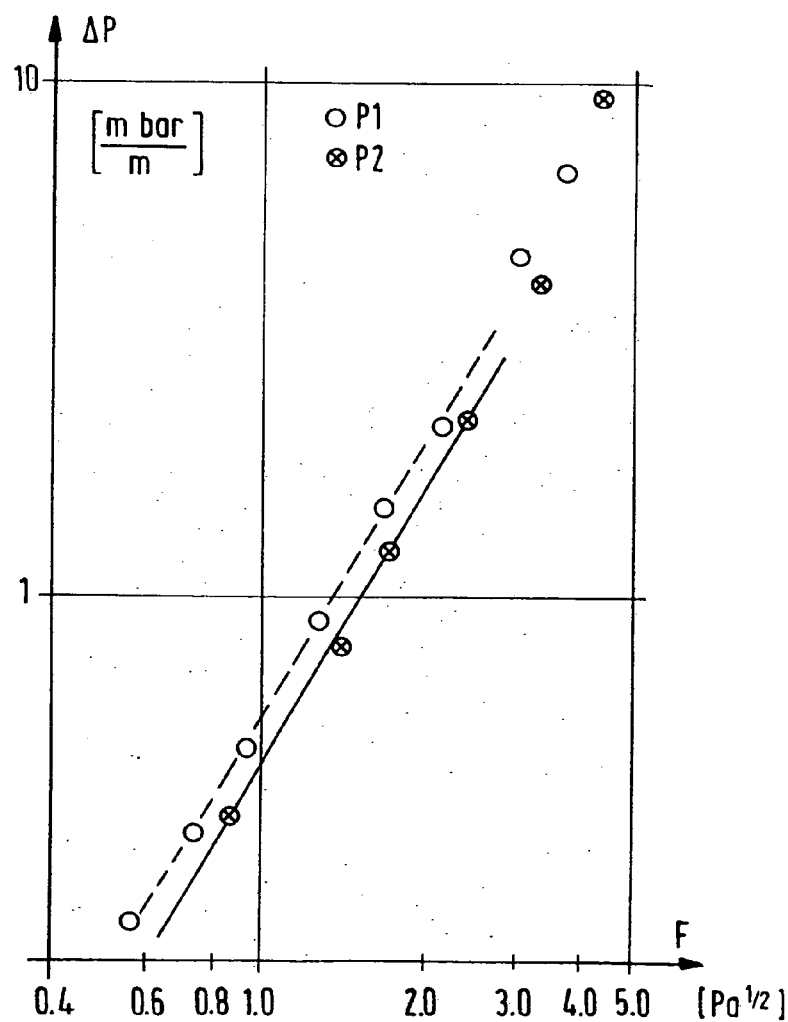

MASS TRANSFER METHOD USING STATIC PACKINGS

This invention relates to a mass transfer method using static packings. More particularly, this invention relates to the use of a cross-passage packing made of a metal fabric in a mass transfer operation.

Packings with a cross-passage structure have been known for some decades, for example, as described in Swiss patent CH-A-398 503. The cross-passage packings are, as a rule, composed of a plurality of packing elements arranged on top of one another, with each packing element being made up of a plurality of parallel layers. The layers, which are made as "corrugated lamella", contact one another to form the cross-passage structure as well as flow passages that are inclined with respect to the vertical (column axis) and are open with respect to one another. An exchange of material and/or heat can be carried out with such a column packing which takes place at a phase interface between a descending liquid film on the packing surface and a gas stream flowing through the passages.

Swiss patent CH-A-398 503 illustrates a cross-passage packing whose "corrugated lamellae" are perforated. A further cross-passage packing, in which perforations are arranged in a particular manner, is described in DE-A-26 01 890. In this latter publication, reference is made to the purpose of the perforations which was already known from the prior art at the time: "The reasons for the presence of the orifices are improved gas exchange over the cross-section of the packing member and reduction of the pressure drop along the column axis". The lamellae can be manufactured, for example, of metallic foils, knitted fabrics or fabrics. The flow passages, which are each formed by a lamella and thus belong to the same layer, are connected by the perforations such that compensation procedures can take place with respect to differences in concentration and in pressure.

In the course of the following years, it was considered a matter of course that the perforations have to be present, among other things, for the reduction of the pressure drop. In striving to achieve ever better results in the use of cross-passage packings, one arrived at a point where one asked oneself the following: had a measure actually been taken with the perforation that is advantageous? For there is at least the disadvantage that material is lost with the perforation. That is, the perforations represent a lack of surface that is not available for the exchange of material and/or heat.

Accordingly, It is an object of the invention to improve the mass transfer characteristics of cross-passage packings in comparison with the known uses of such packings.

Briefly, the invention is directed to a method that uses a cross-passage packing of a metal fabric in which an exchange of material and/or heat is carried out between a liquid stream and a stream of gas or vapor.

The fabric packing used is composed of vertical layers that consist of corrugated or pleated metal fabrics that form flow passages. In use, a stream of gas or vapor flows in the flow passages and the liquid stream flows on the metal fabric. The flow passages of adjacent layers cross openly. The angle between crossing passages is smaller than approximately 100°.

In accordance with the method, the fabric packing is acted on by a relatively small liquid loading and the metal fabric forms a carrier for the liquid stream which is unperforated, i.e. largely free of perforations or other openings.

Values are chosen for the liquid loading in accordance with the relationship $L/a < 10$ l/mh, where L is the specific surface loading in volume units of the liquid per surface unit of the packing cross-section and a is the specific surface area which the metal fabric spans.

If the pressure loss is determined in the use of the fabric packing in accordance with the invention and if a corresponding measurement is carried out for the known packing which is made of perforated metal fabrics, an unexpected result is found. In this comparative measurement, a parameter decisive for the material exchange process is set equal, namely the wetted surface of the packing at the same volume. Contrary to the older teaching, in accordance with which the pressure drop along the column axis could be reduced by the perforations, a pressure drop was surprisingly found with the perforation-free fabric packing which is significantly smaller. This applies as long as the fabric packing is acted on by a relatively small liquid loading in the process and the gas stream is therefore also low to a corresponding degree. Since the metal fabrics form "self-wetting" carriers of the liquid stream, a small liquid loading is actually also realisable.

Comparative measurements were carried out with fabric packings whose perforation proportions were of different size. On an evaluation of the trials, in which a change of the hydraulic diameter was also taken into account, one arrived at the recognition that, with the fabric packing with perforations, the perforations contribute to an increase in pressure loss. This fact is contrary to the school of thought. Consequently, one should largely or completely leave out a perforation in the fabric packing under the recited conditions.

These and other objects and advantages of the invention will become more apparent from the following detailed description taken in conjunction with the accompanying drawings in which:

FIG. 3 is a diagram on the separation efficiency of two fabric packings compared to one another; and FIG. 4 is a diagram on the pressure loss for the same packings.

Figure 1:
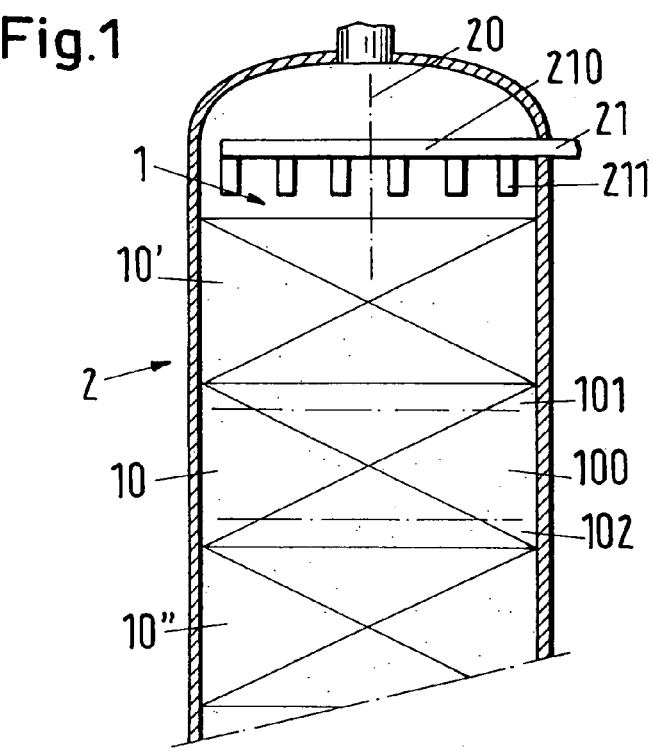
FIG. 1 illustrates an upper part of a column with packing elements.

Referring to FIG. 1, a column 2 having a vertical axis 20 contains a packing 1 and a liquid distributor (infeed tube 210, distributor passages 211).

The packing 1 is formed of a plurality of packing elements 10, 10', 10" stacked or arranged on top of one another. When the column is in use, a liquid and a gas or vapor flow incounter flow.

In special embodiments of the column 2, the packing elements can be arranged to define a lower end zone 102, a central zone 100 and an upper end zone 102. In addition, the flow resistance in the end zones 101 and 102 at the ends of the packing elements 10 may be reduced with respect to that of the central zone by a suitable shaping. Such advantageous embodiments are known from the patent specification EP 0 858 366.

Figure 2:
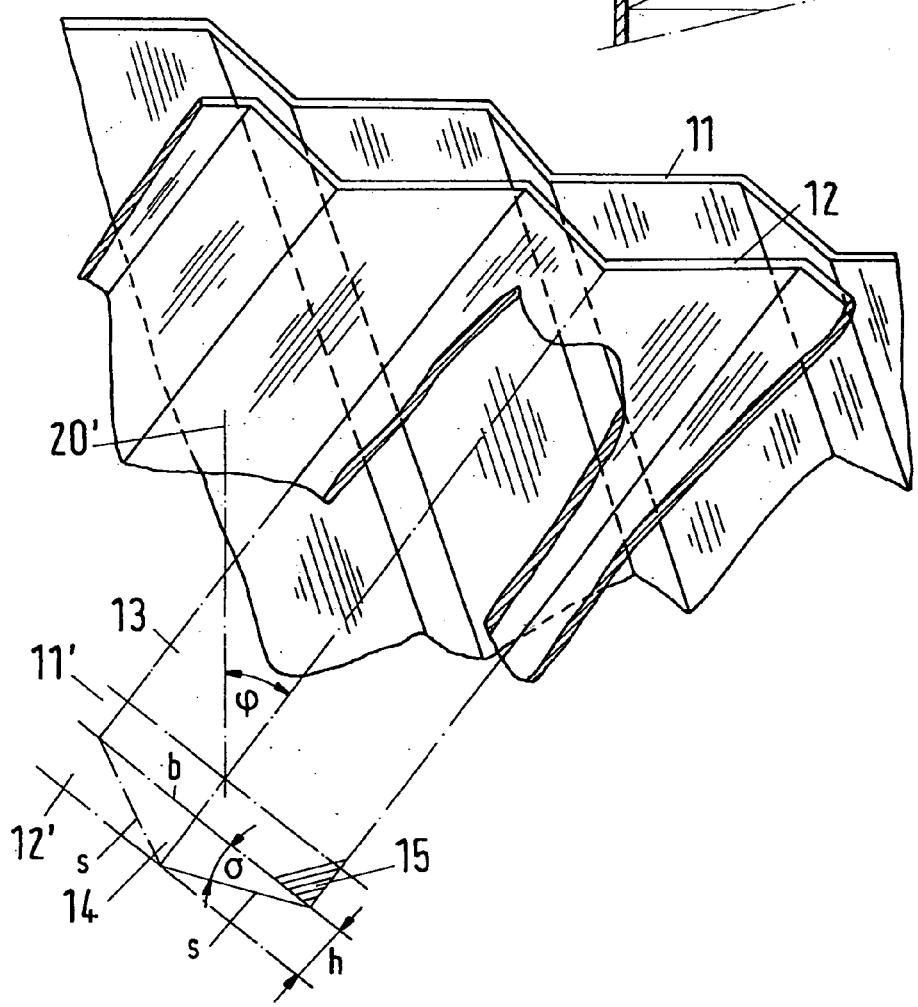
FIG. 2 illustrates a fragment of an unperforated packing with a cross-passage structure in accordance with the invention.

Each packaging element 10 is built up of a plurality of parallel layers 11', 12' as indicated in FIG. 2. Parallel passages 13 with triangular cross-sections 14 are formed in the layers 11', 12' by metal fabrics 11 and 12, respectively folded in zig-zag manner. (The metal fabrics 11, 12 can also be corrugated.) The passages are inclined with respect to the vertical 20'—a parallel line to the column axis 20. The passages include an inclination angle φ. At a contact plane 15 between adjacent layers 11', 12', the passages 13 of the layer 12', which are open in this plane 15, cross corresponding passages of the adjacent layer 11'. The crossing angle which amounts to 2φ is lower than approximately 100°.

The cross-section 14 has the shape of an isosceles triangle with a height h (=width of the layer 12'), sides s and a base b which is also termed a step. The angle σ between the sides s and the base b in many cases amounts to 45°. The specific surface area a of this packing with σ=45° is given in the ideal case that the folding edges have no roundings by the expression $2\sqrt{2}/h$. Both sides of the metal fabric are counted in this process.

The specific surface area a is defined independently of whether a perforation is present or not. The wetted surface area a', in contrast, depends on whether the metal fabric is perforated. In the aforementioned comparative trials, packings were compared in which the wetted surfaces a' were of equal size.

The following dimensions were selected for a first fabric packing P1 with a large portion of perforation: layer height=6.5 mm; base b=10.2 mm; specific surface a=507 $m^2/m^3$; wetted surface a'=450 $m^2/m^3$; inclination angle φ=30°; perforation: 11% hole proportion, i.e. proportion of the fabric surface which is open (perforation diameter: 4 mm).

The following dimensions were selected for a second fabric packing P2 with a smaller portion of perforation: layer height=7 mm; base b=10.2 mm; specific surface a=475 $m^2/m^3$; wetted surface a'=450 $m^2/m^3$; inclination angle φ=30°; perforation: 5% perforation proportion (perforation diameter: 4 mm).

Measurements were taken with the two packings P1 and P2 in a column with a diameter of 250 mm and with a head pressure of 50 mbar. The measurements were carried out with a mixture to be separated of chlorobenzene and ethylbenzene.

In the diagrams of the FIGS. 3 and 4, measured results are shown for the two packings P1 and P2 (logarithmic scales). In the diagram of FIG. 3, the separation efficiency is recited in dependence on the F factor, i.e. $F=v_G\sqrt{\rho_G}$ (where $v_G$=flow rate and $\rho_G$=density of the gas G). The separation efficiency is expressed as the number n of theoretical separation stages per meter (NTSM). No significant difference can be found for the two packings P1 and P2. However, there is a difference in the diagram of FIG. 4. This diagram shows the pressure loss measured in each case in the packings P1 and P2.

The compared packings P1 and P2 have the same wetted surface a', but different specific surfaces a, and thus different hydraulic diameters $d_h$. With a larger hydraulic diameter (P2 with $d_h$=7.9 mm), the pressure drop is somewhat smaller than with a smaller hydraulic diameter (P1 with $d_h$=7.4 mm). Surprisingly, the pressure loss in the packing P2 is reduced to a greater degree than would be expected due to the hydraulic diameter.

As far as the pressure loss is concerned, under the conditions typical for the packings investigated, this is approximately proportional to the inverse hydraulic diameter. This can be shown with reference to a proven pressure loss model (see J. A. Rocha, J. L. Bravo, J. R. Fair, "Distillation Columns Containing Structured Packings: A Comprehensive Model for Their Performance. 1. Hydraulic Models", Ind. Eng. Chem. Res. 1993, 32, 641-651). It thus results that the packing P2 should have to produce a pressure loss lower by 6.3% than the packing P1. However, a much larger reduction is measured (cf. FIG. 4, namely a reduction by 20%.

If the number of holes is lowered with an equally wetted surface, the following would be expected: a) reduction of the pressure loss by approximately 6 to 7%, because the hydraulic diameter increases (demonstrable with correlations matched to experiments); b) increase of the pressure loss by an amount which cannot be put into figures, because fewer holes are there and the packing is less permeable; c) the two amounts could at best cancel one another out.

In actual fact, the following experience was made:
The pressure loss is reduced by approximately 6 to 7%, because the hydraulic diameter increases.
The pressure loss is reduced by a further approximately 14%, which can only be due to the change in the number of perforations.

Consequently, the perforations in the fabric packing contribute to an increase in pressure loss. This fact is diametrically opposed to the school of thought.

In the method in accordance with the invention, the metal fabric forms a carrier for the liquid stream that is largely free of perforations or of other openings. It is required for this method that values are chosen for the liquid loading in accordance with the following relationship $q'=L/a<0.01\ m^3/mh=10\ l/mh,$ where the parameters used have the following meaning:
L is the specific surface loading in volume units of the liquid per surface unit of the column cross-section;
a is the specific surface area which the metal fabric spans; and
q' is the liquid volume per time unit and yardage of the fabric.

(The yardage is double the counted length of the fabric edge, measured on a column cross-section).

The amount q'=10 l/mh corresponds to L=4.5 $m^3/m^2h$ (per square meter column cross-section and hour) for a fabric packing, for which a=a'=450 $m^2/m^3$ (no perforation). This maximum loading is typical for a total reflux and for the following cases:
Test mixture cis-/transdekalin at 50 mbar head pressure and an F factor F lower than 2.2 $\sqrt{Pa}$
Test mixture cis-/transdekalin at 10 mbar head pressure and F<5 $\sqrt{Pa}$
Test mixture chlorobenzene/ethylbenzene at 50 mbar head pressure and F<2.6 $\sqrt{Pa}$
Text mixture chlorobenzene/ethylbenzene at 100 mbar head pressure and F<1.8 $\sqrt{Pa}$ The loading is thus typical for the use of the cross-passage packing in vacuum at 100 mbar.

The method of the invention is particularly suitable when a plurality of packing elements (10, 10', 10") are arranged on top of one another and when the following applies: a lower end zone (102), a central zone (100) and an upper end zone (102) can be respectively distinguished in the packing elements. The flow resistance in the end zones (101, 102) at at least one of the ends of the packing elements is reduced with respect to that of the central zone due to a suitable shaping. In this packing, an additional improvement results with respect to the pressure drop. The shaping of the end zone (101, 102) is in particular designed such that the local direction of the flow passages changes progressively in each case such that the flow passages have a sigmoid course.

The invention claimed is:
1. A method of mass transfer of a material or heat comprising the steps of
providing a cross-passage packing having a plurality of vertically disposed corrugated layers disposed in parallel relation for a descending flow of liquid thereon, each said layer having an unperforated surface defining flow passages disposed in crisscrossing relation to an adjacent layer and at an angle of less than approximately 100° for a flow of vapor therethrough; and loading said packing with liquid at a liquid loading value selected in accordance with the relationship:

$L/a < 10 \text{ l/mh}$ wherein:

L is the specific surface loading in volume units of the liquid per surface unit of the packing cross-section; and a is the specific surface area of said layers.

2. A method in accordance with claim 1, characterised in that the flow of liquid and the flow of vapour are in counter flow.

3. A method in accordance with claim 1 characterised in that L/a is less than 1 l/mh.

4. A method in accordance with claim 1 characterised in that L/a is less than 0.2 l/mh.

5. A method in accordance with any of claims 1 to 4 characterised in that the specific surface area a of the packing amounts to between 300 and 800 $m^2/m^3$.

6. A method in accordance with any of claims 1 to 4 characterised in that the specific surface area a of the packing amounts to between 300 and 500 $m^2/m^3$.

7. A method in accordance with claim 1 further comprising the steps of stacking a plurality of packing elements vertically on top of one another to define a lower end zone, a central zone and an upper end zone, wherein the packing elements are shaped to impart a flow resistance in said end zone at at least one of the ends of the packing elements lower than the flow resistance of the central zone.

8. A method in accordance with claim 7, characterised in that the shaping of a respective end zone is effective to progressively change the local direction of the flow passages therein.

* * * * *

(12) INTER PARTES REEXAMINATION CERTIFICATE (595th)
United States Patent
Kehrer et al.

(10) Number: US 7,434,794 C1
(45) Certificate Issued: May 7, 2013

(54) MASS TRANSFER METHOD USING STATIC PACKINGS

(75) Inventors: Florian Kehrer, Effretikon (CH); Marc Wehrli, Winterthur (CH)

(73) Assignee: Sulzer Chemtech AG, Winterthur (CH)

Reexamination Request:
No. 95/001,451, Sep. 24, 2010

Reexamination Certificate for:
Patent No.: 7,434,794
Issued: Oct. 14, 2008
Appl. No.: 10/841,293
Filed: May 7, 2004

(30) Foreign Application Priority Data

May 16, 2003 (EP) .................................... 03405340

(51) Int. Cl.
| | |
|---|---|
| *B01F 3/04* | (2006.01) |
| *B01D 3/26* | (2006.01) |
| *B01J 8/02* | (2006.01) |
| *B01J 19/00* | (2006.01) |
| *B01J 19/30* | (2006.01) |
| *B01J 19/32* | (2006.01) |
| *B01J 35/02* | (2006.01) |
| *B32B 15/00* | (2006.01) |
| *F25J 3/00* | (2006.01) |
| *F25J 5/00* | (2006.01) |
| *F28F 25/08* | (2006.01) |

(52) U.S. Cl.
USPC ................. 261/112.2; 261/DIG. 72

(58) Field of Classification Search
None
See application file for complete search history.

(56) References Cited

To view the complete listing of prior art documents cited during the proceeding for Reexamination Control Number 95/001,451, please refer to the USPTO's public Patent Application Information Retrieval (PAIR) system under the Display References tab.

*Primary Examiner* — Alan Diamond

(57) ABSTRACT

The use of a cross-passage packing made of a metal fabric relates to a method in which an exchange of material and/or of heat is carried out between a liquid stream and a gas or vapour stream. The fabric packing (1) used is composed of vertical layers (11', 12') which consist of corrugated or pleated metal fabrics (11, 12) which form flow passages (13). The gas or vapour stream flows in the flow passages and the liquid stream flows on the metal fabric. The flow passages of adjacent layers cross in an open manner. The angle between crossing passages is lower than approximately 100°. In this method, the fabric packing is acted on by a relatively small liquid loading. The metal fabric forms a carrier for the liquid stream that is largely free of holes or other apertures. Values for the liquid loading are selected in accordance with the relationship $L/a < 10$ l/mh, where L is the specific surface loading in volume units of the liquid per surface unit of the packing cross-section, and a is the specific surface which the metal fabric spans.

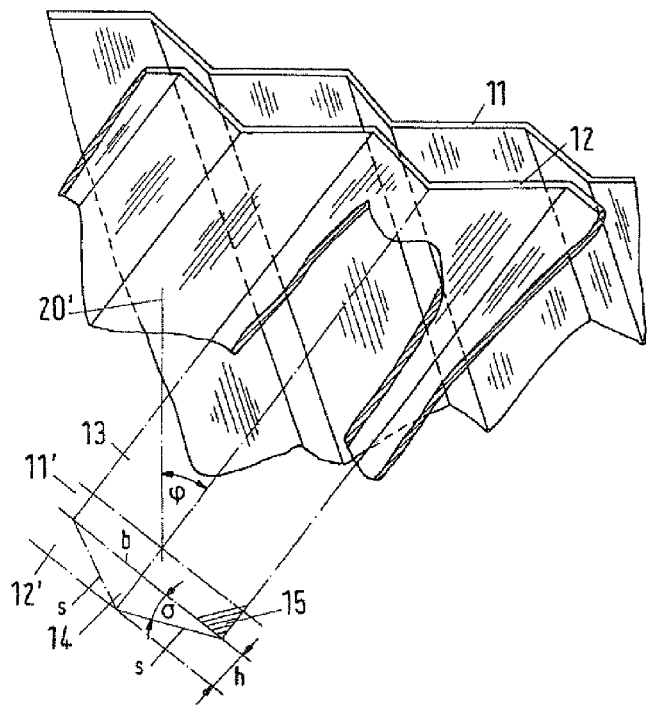

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 66 to column 2, line 3:

Values are chosen for the liquid loading in accordance with the relationship L/a <10 l/mh, where L is the specific surface loading in volume units of the liquid per surface unit of the [packing] *column* cross-section and a is the specific surface area which the metal fabric spans.

AS A RESULT OF REEXAMINATION, IT HAS BEEN DETERMINED THAT:

Claim 1 is determined to be patentable as amended.

Claims 2-8, dependent on an amended claim, are determined to be patentable.

New claims 9 and 10 are added and determined to be patentable.

1. A method of mass transfer of a material or heat comprising the steps of providing a cross-passage packing having a plurality of vertically disposed corrugated layers *of metal fabric* disposed in parallel relation for a descending flow of liquid thereon, each said layer having an unperforated surface defining flow passages disposed in criss-crossing relation to an adjacent layer and at an angle of less than approximately 100° for a flow of vapor therethrough; and loading said packing with liquid at a liquid loading value selected in accordance with the relationship:

L/a <10 l/mh wherein:

L is the specific surface loading in volume units of the liquid per surface unit of the [packing] *column* cross-section; and a is the specific surface area of said layers.

9. *A method in accordance with claim 1 characterised in that L equals 4.5 $m^3/m^2h$ wherein $m^2$ is the square meter column cross-section and h is one hour and a equals 450 $m^2/m^3$.*

10. *A method in accordance with claim 9 characterized in being performed in vacuum at 100 mbar.*

\* \* \* \* \*